(12) United States Patent
Ukrainczyk et al.

(10) Patent No.: US 6,594,419 B2
(45) Date of Patent: Jul. 15, 2003

(54) TAPERED LENSED FIBER FOR FOCUSING AND CONDENSER APPLICATIONS

(75) Inventors: Ljerka Ukrainczyk, Painted Post, NY (US); Debra L. Vastag, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/171,336

(22) Filed: Jun. 12, 2002

(65) Prior Publication Data

US 2002/0191911 A1 Dec. 19, 2002

Related U.S. Application Data

(60) Provisional application No. 60/352,735, filed on Jan. 29, 2002, and provisional application No. 60/298,841, filed on Jun. 15, 2001.

(51) Int. Cl.[7] .................................................. G02B 6/32
(52) U.S. Cl. .............................. 385/33; 385/31; 385/43
(58) Field of Search ................................ 385/31–33, 43

(56) References Cited

U.S. PATENT DOCUMENTS

| | | | |
|---|---|---|---|
| 3,832,028 A | * 8/1974 | Kapron | 385/124 |
| 4,186,999 A | 2/1980 | Harwood et al. | 350/96.21 |
| 4,281,891 A | 8/1981 | Shinohara et al. | 350/96.18 |
| 4,380,365 A | 4/1983 | Gross | |
| 4,456,330 A | 6/1984 | Bludau | 350/96.18 |
| 4,496,211 A | 1/1985 | Daniel | |
| 4,542,987 A | 9/1985 | Hirschfeld | 356/44 |
| 4,737,006 A | 4/1988 | Warbrick | 350/96.18 |
| 4,743,283 A | 5/1988 | Borsuk | 65/2 |
| 4,784,466 A | 11/1988 | Khoe et al. | 350/96.33 |
| 4,785,824 A | 11/1988 | Wickersheim et al. | 128/736 |
| 4,896,942 A | * 1/1990 | Onstott et al. | 385/127 |
| 5,008,545 A | 4/1991 | Anderson et al. | 250/358.1 |
| 5,039,193 A | 8/1991 | Snow et al. | 385/25 |
| 5,551,968 A | * 9/1996 | Pan | 264/1.24 |
| 5,647,041 A | 7/1997 | Presby | 385/43 |
| 5,699,464 A | 12/1997 | Marcuse et al. | 385/33 |
| 5,754,717 A | 5/1998 | Esch | 385/31 |
| 5,774,607 A | 6/1998 | Shiraishi et al. | 385/33 |
| 5,908,562 A | * 6/1999 | Ohtsu et al. | 216/11 |
| 5,946,441 A | 8/1999 | Esch | 385/139 |
| 6,094,517 A | * 7/2000 | Yuuki | 385/43 |
| 6,130,972 A | 10/2000 | Shiraishi et al. | 385/33 |
| 6,282,347 B1 | 8/2001 | Ono et al. | 385/74 |

FOREIGN PATENT DOCUMENTS

| | | | | |
|---|---|---|---|---|
| EP | 0 278 212 B1 | 9/1993 | | G02B/6/32 |
| WO | WO 00/34810 | 6/2000 | | G02B/6/02 |

* cited by examiner

*Primary Examiner*—Ellen E. Kim
(74) *Attorney, Agent, or Firm*—Adenike A. Adewuya; Timothy M. Schaeberle

(57) ABSTRACT

A tapered lensed fiber includes a tapered multimode fiber having a gradient-index core and an optical fiber attached to the tapered multimode fiber. A method for forming a tapered lensed fiber includes attaching an optical fiber to a multimode fiber having a gradient-index core, applying heat to a surface of the multimode fiber, and pulling the multimode fiber into a taper. The method also allows for forming a tapered polarization-maintaining fiber while preserving stress rods and polarization isolation properties of the polarization-maintaining fiber.

17 Claims, 4 Drawing Sheets

TAPERED LENSED FIBER FOR FOCUSING AND CONDENSER APPLICATIONS

CROSS-REFERENCE TO RELATED APPLICATIONS

This application claims priority from U.S. Provisional Application Ser. No. 60/298,841, entitled "Thermally Formed Lensed Fibers for Imaging and Condenser Applications," filed Jun. 15, 2001 and U.S. Provisional Application Serial No. 60/352,735, "Tapered Lensed Fiber For Focusing and Condenser Applications", filed Jan. 29, 2002.

BACKGROUND OF INVENTION

1. Field of the Invention

The invention relates generally to lensed fibers for delivering and collecting light in optical communication networks. More specifically, the invention relates to a tapered lensed fiber for focusing and condenser applications and a method for forming the tapered lensed fiber.

2. Background Art

A lensed fiber is a monolithic device having an optical fiber terminated with a lens. Lensed fibers are advantageous because they are easy to assemble, i.e., they do not require active fiber-lens alignment and gluing of fiber to lens, they have low insertion loss, and they enable component miniaturization because they can be made very small. The coefficient of thermal expansion of the lens can be matched to that of the optical fiber to achieve better performance over a temperature range. Lensed fibers are easily arrayed and are therefore desirable for making arrayed devices, for use in silicon optical bench applications, for aligning optical fibers to planar waveguides, and so forth. In addition, the spot size and working distance of the lensed fiber can be tailored for a specific application. For example, the spot size and working distance can be tailored to produce smaller beam diameters that can allow use of smaller micro-electro-mechanical-systems (MEMS) mirrors in optical switches.

There are three main types of lensed fibers, including collimating lensed fibers, focusing lensed fibers, and tapered lensed fibers. FIG. 1 shows a prior-art collimating lensed fiber 20 having a planoconvex lens 22 fusion-spliced to one end of an optical fiber 24. The optical fiber 24 may be a single-mode or multimode fiber. In the illustration, the optical fiber 24 is a single-mode fiber. The planoconvex lens 22 is formed from a coreless fiber, and the front surface of the lens 22 is shaped like a sphere. The spherical surface of the lens 22 is typically formed by melting the coreless fiber using an electric arc or a laser beam. The spherical surface of the lens 22 acts as a collimator, expanding the light coming out of the optical fiber 24 into a collimated beam. In practice, the lensed fiber 20 is used to couple light from one fiber to another.

FIG. 2A shows a prior-art focusing lensed fiber 26 having a first square-law index fiber 28 fusion-spliced to one end of a single-mode fiber 30. A second square-law index fiber 32 is connected to the first square-law fiber 28. A convex surface 34, which acts as a lens, may be provided at a distal end 36 of the second square-law index fiber 32. In general, the radius of curvature of the convex surface 34 is smaller than the radius of curvature of the lens for the collimating lensed fiber (see lens 22 in FIG. 1). The focusing lensed fiber 26 focuses light into a spot and is useful for focusing applications, such as focusing a beam onto a detector or receiver and coupling light from a laser source to an optical fiber.

There are various methods for providing the convex surface 34 at the distal end 36 of the second square-law index fiber 32. One method involves melting the distal end 36 to form a hemispherical surface. A second method involves chemically etching the distal end 36 to form the convex surface 34. A third method, which is illustrated in FIG. 2B, involves fusion-splicing a coreless fiber 38 to the distal end 36 of the second square-law index fiber 32 and then melting the coreless fiber 38 to form a hemispherical surface. Melting is usually based on electric discharge.

FIG. 3 shows a prior-art tapered lensed fiber 40 having a taper 42 formed at a tip of a single-mode fiber 44. The taper 42 has a convex surface 46 that acts as a lens. The taper 42 can be achieved by grinding and/or polishing the tip of the single-mode fiber 44. The tapered lensed fiber collimates light over a short working distance. The tapered lensed fiber can be used for coupling light between an optical fiber and a laser source or an optical amplifier or a planar waveguide.

SUMMARY OF INVENTION

In one aspect, the invention relates to a tapered lensed fiber which comprises a tapered multimode fiber having a gradient-index core and an optical fiber attached to the tapered multimode fiber.

In another aspect, the invention relates to a method for forming a tapered lensed fiber which comprises attaching an optical fiber to a multimode fiber having a gradient-index core, applying heat to a surface of the multimode fiber, and pulling the multimode fiber into a taper.

In another aspect, the invention relates to a method for forming a tapered polarization-maintaining fiber which comprises attaching a polarization-maintaining fiber to a multimode fiber having a gradient-index core, applying heat to a surface of the multimode fiber, and pulling the multimode fiber into a taper.

In another aspect, the invention relates to a tapered polarization-maintaining fiber which comprises a tapered multimode fiber having a gradient-index core and a polarization-maintaining fiber attached to the tapered multimode fiber.

Other features and advantages of the invention will be apparent from the following description and the appended claims.

DETAILED DESCRIPTION

Embodiments of the invention provide a tapered lensed fiber for focusing and condenser applications and a method for fabricating the tapered lensed fiber. In general, the tapered lensed fiber includes a multimode fiber spliced to any single-mode fiber, including a polarization-maintaining (PM) fiber. A PM fiber propagates only one polarization. The multimode fiber has a gradient-index (GRIN) core, i.e., the refractive index of the core changes according to a predetermined profile. The multimode fiber is pulled to create a taper. Typically, the pulling process is accompanied by heating of the multimode fiber. The lens effect of the tapered fiber comes from both refraction and gradient index in the taper. Therefore, there is more flexibility in tailoring the mode field diameter (MFD) and divergence angle of the lensed fiber for a specific application, which ultimately leads to improved coupling efficiency. The method of the invention allows tapered PM fibers to be formed while preserving stress rods and polarization isolation properties of the PM fibers. Specific embodiments of the invention are described below with reference to the accompanying figures.

Figure 1:
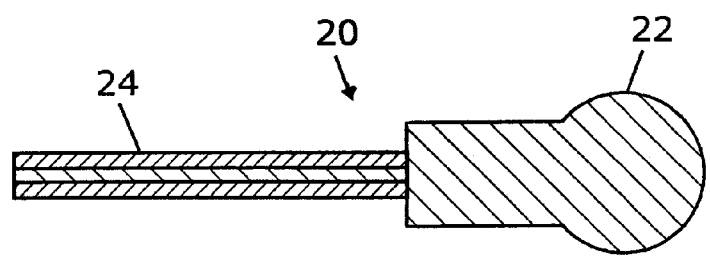
FIG. 1 shows a prior art collimating lensed fiber.
Figure 2A:
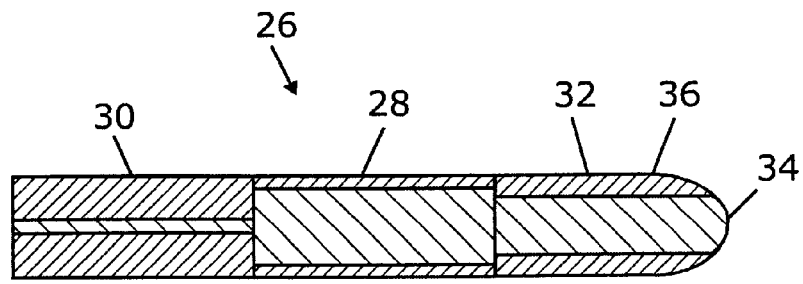
FIGS. 2A and 2B show prior art focusing lensed fibers.
Figure 2B:
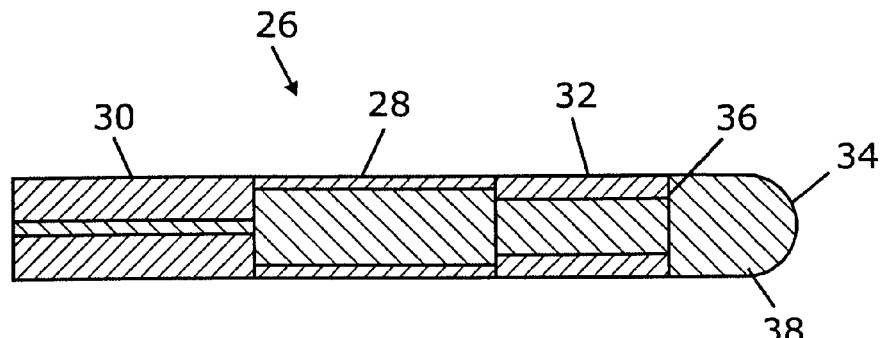
Figure 3:
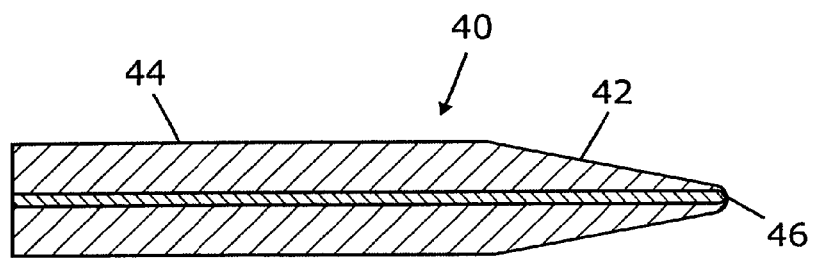
FIG. 3 shows a prior art tapered lensed fiber.
Figure 4:
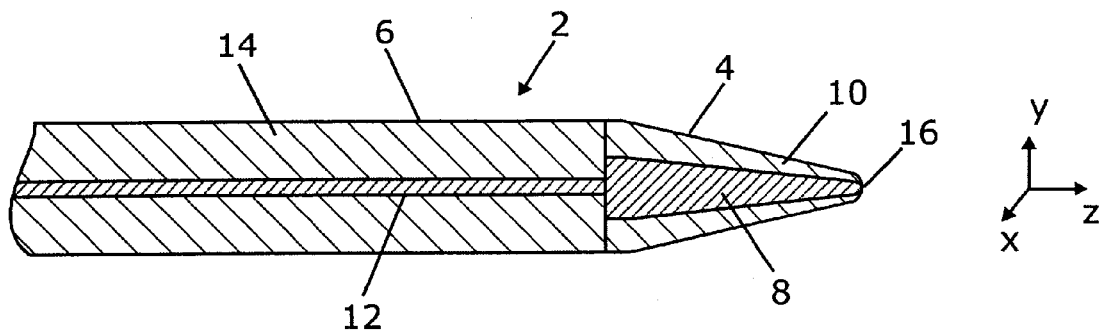
FIG. 4 shows a tapered lensed fiber according to an embodiment of the invention.

FIG. 4 shows a tapered lensed fiber 2 according to one embodiment of the invention. The tapered lensed fiber 2 includes a tapered multimode fiber 4 attached to an optical fiber 6. The multimode fiber 4 can be attached to the optical fiber 6 by any suitable means, e.g., by fusion-splicing or by an index-matched epoxy. The tapered multimode fiber 4 has a core 8 surrounded by a cladding 10. The core 8 has a gradient index in that its refractive index varies according to a predetermined profile, where the profile is determined by the target application. Methods for making multimode fibers with GRIN cores are known in the art. Typically, the gradient refractive index is achieved by introducing dopants into different layers of the glass material that forms the core. The optical fiber 6 also has a core 12 which is surrounded by a cladding 14. The optical fiber 6 could be any single-mode fiber, including PM fiber.

Figure 5A:
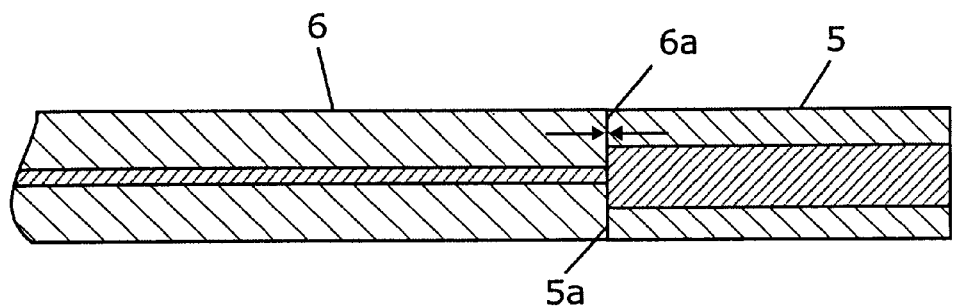
FIG. 5A shows a multimode fiber spliced to a single mode fiber.
Figure 5B:
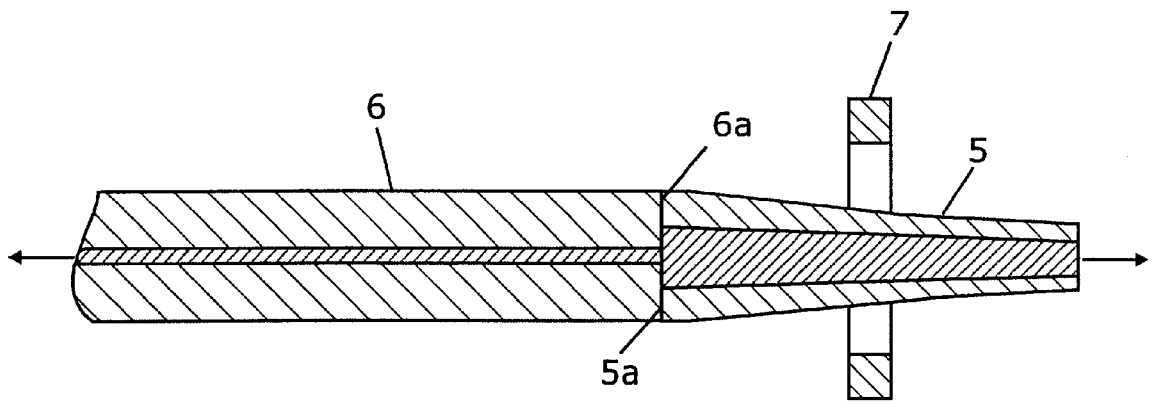
FIG. 5B shows the multimode fiber of FIG. 5A being tapered.

FIGS. 5A and 5B illustrate a method for forming the tapered lensed fiber (2 in FIG. 4). In accordance with this method, a multimode fiber 5, which will become the tapered multimode fiber 4 in FIG. 4, is fusion-spliced to the optical fiber 6. The process for fusion-splicing the fibers 5, 6 involves placing the terminal ends 5a, 6a of the fibers 5, 6 in abutting position, as shown in FIG. 5A, and then heating the ends 5a, 6a while pushing them together, as shown by the arrows. Any suitable source of heat, such as resistive heating, electric arc, or laser beam, can be used to fuse the ends 5a, 6a together. Once the fibers 5 and 6 are fusion-spliced together, the multimode fiber 5 is then subject to a tapering step.

As shown in FIG. 5B, the tapering step involves moving a heat source 7 along the multimode fiber 5 while pulling the multimode fiber 5 and optical fiber 6 in opposite directions, along their longitudinal axes, as indicated by the arrows. The multimode fiber 5 elongates as it is pulled. Preferably, the heat source 7 is a resistive filament. One advantage of using a resistive filament is better control of the taper angle and symmetry. An example of a resistive filament suitable for use in the invention is a tungsten filament loop included in a fusion splicer sold under the trade name FFS-2000 by Vytran Corporation of Morganville, N.J. However, it should be clear that the invention is not limited to this specific resistive filament or to resistive heating. For example, the heat source 7 could also be an electric arc or a laser beam.

When the tapering process is complete, the multimode fiber 5 will look like the multimode fiber 4 in FIG. 4. The tapered multimode fiber 4 shown in FIG. 4 acts as a lens, where the lens effect comes from the refraction and gradient index in the tapered multimode fiber 4. Typically, the length of the tapered multimode fiber 4 is about 125 µm or greater.

As shown in FIG. 4, the tip 16 of the tapered multimode fiber 4 has a radius of curvature. Typically, the radius of curvature is small, e.g., about 5 to 30 µm. The resistive filament (7 in FIG. 5B) used in forming the tapered multimode fiber 4 allows for formation of a spherical tip (or lens) 16 with a symmetrical mode field. The radius of curvature of the tip 16 of the tapered multimode fiber 4 can be adjusted by controlling the power supplied to the filament (7 in FIG. 5B). In general, the higher the power supplied to the filament (7 in FIG. 5B), the larger the radius of curvature.

It should be noted that the method of forming a tapered lensed fiber described above allows for the combination of tapered fiber features with PM fibers. Ordinarily, if a PM fiber is pulled into a taper, stress rods in the PM fiber will be destroyed. If stress rods are destroyed, the polarization isolation properties of the PM fiber will not be maintained. In the present invention, the polarization isolation properties of the PM fiber can be maintained by splicing a multimode fiber to the PM fiber and then subjecting the multimode fiber to a tapering process.

In operation, a light beam transmitted through the tapered lensed fiber 2 is focused into a spot upon exiting the tapered multimode fiber 4. In general, the larger the radius of curvature of the tip 16 of the tapered multimode fiber 4, the larger the spot size.

The following example is intended for illustration purpose only and is not to be construed as limiting the invention as otherwise described herein.

Figure 6:
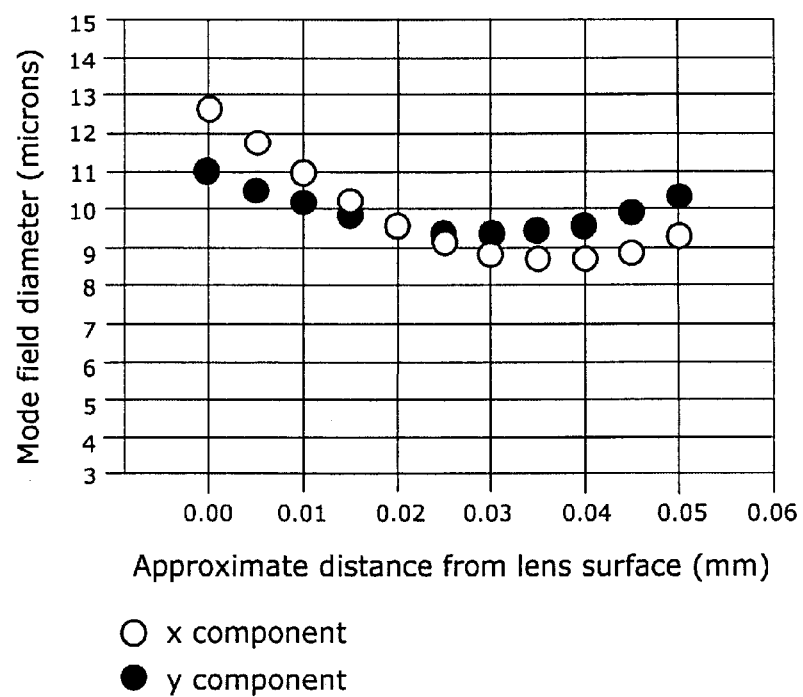
FIG. 6 shows mode field diameter as a function of distance from lens surface for a tapered lensed fiber formed according to an embodiment of the invention.

FIG. 6 shows mode field diameter along the x and y axes (see FIG. 4) as a function of distance along the z-axis (see FIG. 4) for a tapered lensed fiber having a multimode fiber with an outer diameter of 125 µm and a GRIN core of diameter 62.5 µm fusion-spliced to a single-mode fiber with a 9-µm core. The zero point on the z-axis (see FIG. 4) was estimated from divergence angle in the lens of the beam emerging at the splice formed between the multimode fiber and the single-mode fiber. The beam measurements were taken with a beam scan using 10 times objective at a numerical aperture of 0.17.

Figure 7:
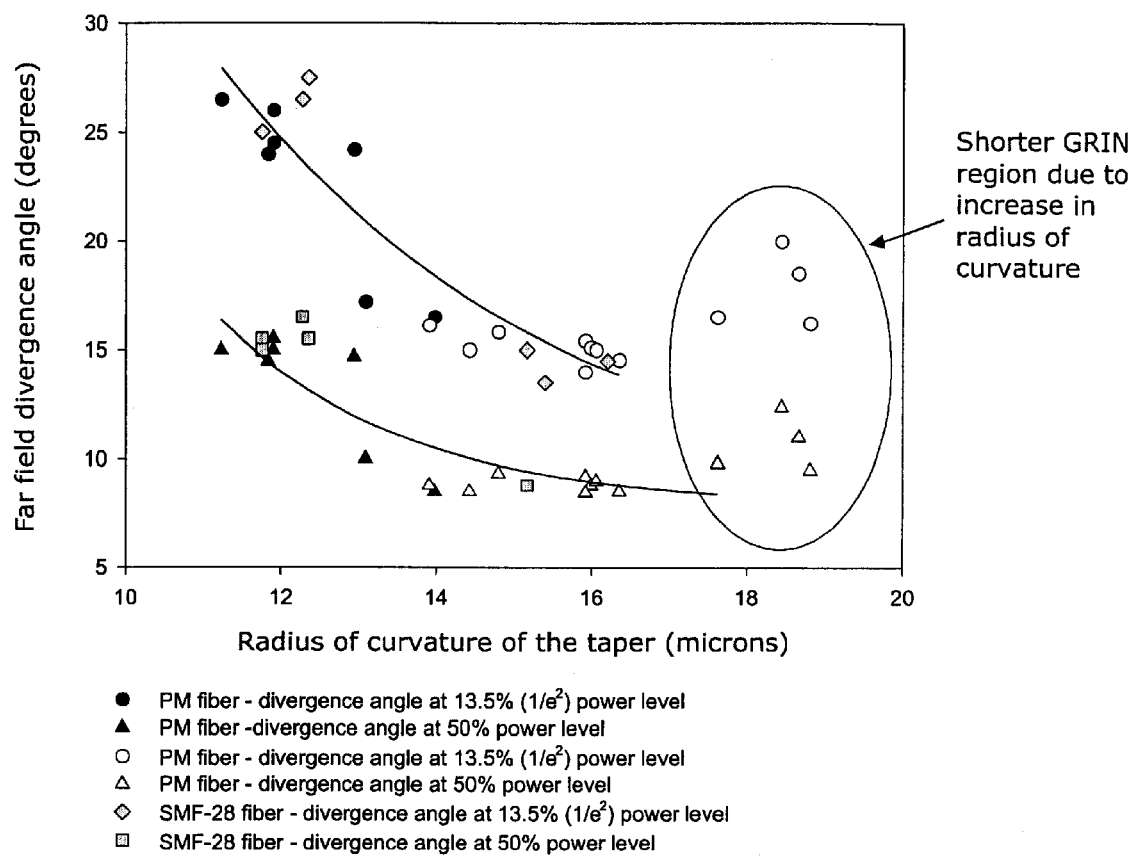
FIG. 7 shows far field divergence angle as a function of radius of curvature of taper for tapered lensed fibers formed according to an embodiment of the invention.

FIG. 7 shows angular radiation intensity as a function of radius of curvature of tapers formed at the end of multimode fibers. The multimode fibers had a 125-µm outer diameter and a 62.5-µm GRIN core. The radiation intensity was measured in far field by scanning from +72 to -72 degrees using a goniometric radiometer LD 8900, available from Photon Inc. The graph contains data for both a single-mode fiber and a polarization-maintaining fiber fusion spliced to the multimode fiber. The single-mode fiber was a Corning® SMF-28 fiber having a 9-µm core and a 10.4-µm mode field diameter. Measurements were made using a broadband erbium amplified spontaneous emission laser source. The graph shows a dependence between divergence angle and radius of curvature of the taper. The far-field divergence angle at $1/e^2$ power level ($\theta$) and the mode field radius at beam waist ($w_o$) of the taper at the waist can be related using $\theta = \lambda/(\pi w_o)$.

The multimode fibers were tapered at a length of about 300 µm and then rounded to the desired radius of curvature. In general, the length of the GRIN region decreases as the radius of curvature increases. At a small radius of curvature, the divergence angle increases with decreasing radius of curvature, as is expected for a typical tapered fiber. However at a radius of curvature of about 16 µm, the divergence angle starts to level off. At a radius of curvature greater than 16 µm, the divergence angle increases again. The divergence increases because the GRIN region becomes shorter with larger radius of curvature.

The invention provides one or more advantages. A tapered lensed fiber can be formed by fusion-splicing a single-mode fiber to a multimode fiber and then tapering the multimode fiber. Using this same method, a tapered PM fiber that maintains its polarization isolation properties can be formed. The tapered lensed fiber of the invention can be used for a variety of applications. For example, the tapered lensed fiber can be used to couple light from a single-mode fiber into a semiconductor optical amplifier or planar waveguide or other optical device. Also, the tapered lensed fiber can be used to couple light in the opposite direction, i.e., from a semiconductor optical amplifier or a planar waveguide or a spherical laser source or other optical device to a single-mode fiber.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tapered lensed fiber, comprising:
    a tapered multimode fiber having a gradient-index core, wherein the tapered multimode fiber is terminated with a radius of curvature, wherein the radius of curvature ranges from about 5 to 30 $\mu$m; and
    an optical fiber attached to the tapered multimode fiber.

2. A method for forming a tapered lensed fiber, comprising:
    attaching an optical fiber to a multimode fiber having a gradient-index core;
    applying heat to a surface of the multimode fiber; and
    pulling the multimode fiber into a taper.

3. The method of claim 2, wherein applying heat to the surface of the multimode fiber comprises using a resistive filament to provide the heat.

4. The method of claim 3, wherein applying heat to the surface of the multimode fiber further comprises moving the resistive filament along the surface of the multimode fiber during heating.

5. The method of claim 2, wherein applying heat to the surface of the multimode fiber and pulling the multimode fiber into a taper occur simultaneously.

6. The method of claim 2, wherein pulling the multimode fiber into a taper comprises forming a radius of curvature at a distal end of the taper.

7. The method of claim 6, wherein the radius of curvature ranges from about 5 to 30 $\mu$m.

8. The method of claim 2, wherein attaching the multimode fiber to the optical fiber comprises fusion-splicing the multimode fiber to the optical fiber.

9. The method of claim 2, wherein pulling the multimode fiber into a taper comprises simultaneously pulling the optical fiber and the multimode fiber in opposite directions along a longitudinal axis of the multimode fiber.

10. The method of claim 2, wherein the optical fiber is a single-mode fiber.

11. The method of claim 10, wherein the single-mode fiber is a polarization-maintaining fiber.

12. A method for forming a tapered polarization-maintaining fiber, comprising:
    attaching a polarization-maintaining fiber to a multimode fiber having a gradient-index core;
    applying heat to a surface of the multimode fiber; and
    pulling the multimode fiber into a taper.

13. The method of claim 12, wherein applying heat to the surface of the multimode fiber comprises using a resistive filament to provide the heat.

14. The method of claim 12, wherein applying heat to the surface of the multimode fiber and pulling the multimode fiber into a taper occur simultaneously.

15. The method of claim 12, wherein pulling the multimode fiber into a taper comprises forming a radius of curvature at a distal end of the taper.

16. The method of claim 12, wherein attaching the polarization-maintaining fiber to a multimode fiber comprises fusion-splicing the polarization-maintaining fiber to the multimode fiber.

17. A tapered polarization-maintaining fiber, comprising:
    a tapered multimode fiber having a gradient-index core, wherein the multimode fiber is terminated with a radius of curvature, wherein the radius of curvature ranges from 5 to 30 $\mu$m; and
    a polarization-maintaining fiber attached to the tapered multimode fiber.

* * * * *